Figure 1:
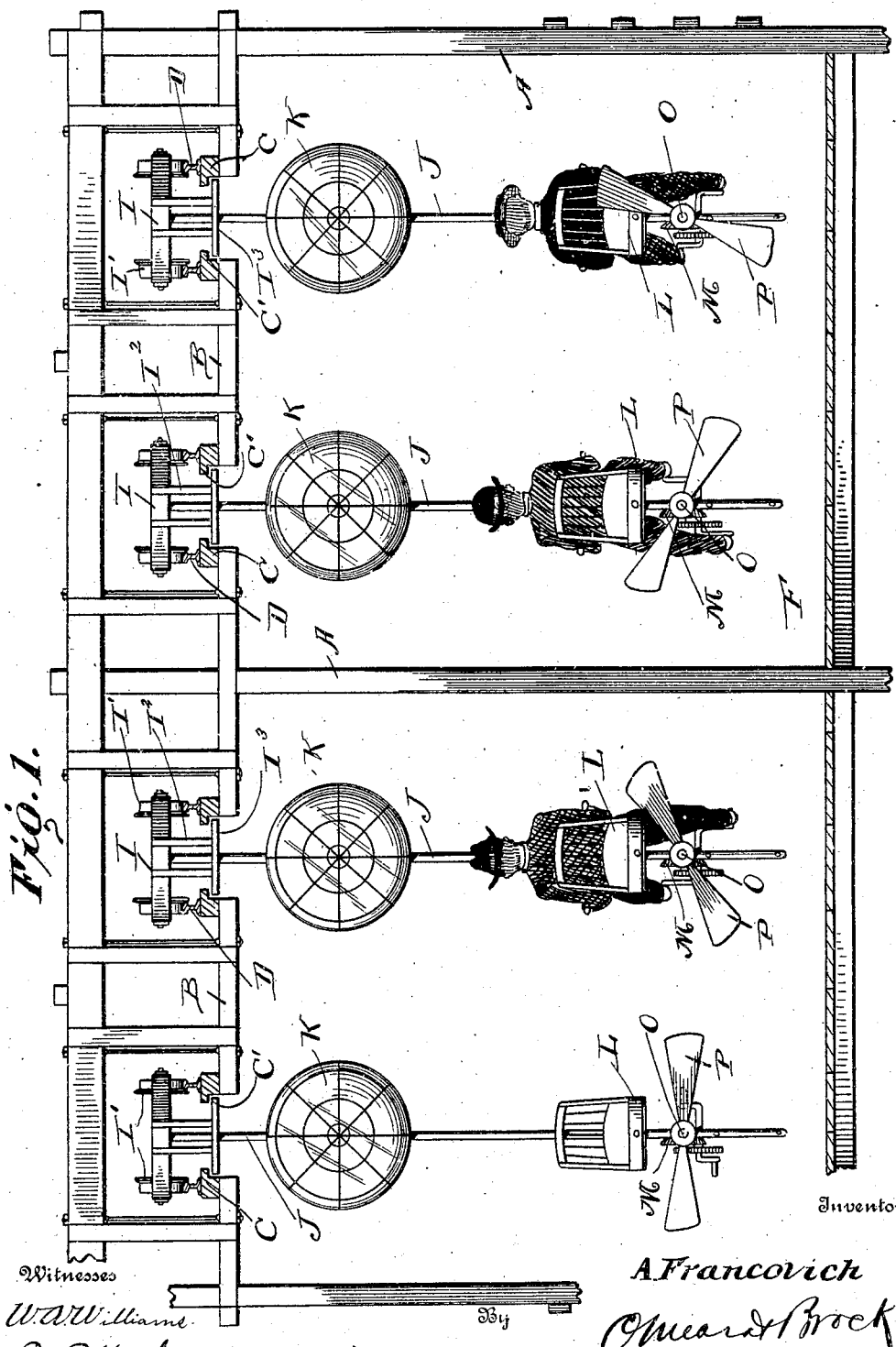

No. 844,116. PATENTED FEB. 12, 1907.
A. FRANCOVICH.
AMUSEMENT DEVICE.
APPLICATION FILED FEB. 10, 1906.

3 SHEETS—SHEET 1.

Witnesses
W. A. Williams
Rex P. Albright

Inventor
A. Francovich
O'Meara & Brock
By
Attorneys

No. 844,116. PATENTED FEB. 12, 1907.
A. FRANCOVICH.
AMUSEMENT DEVICE.
APPLICATION FILED FEB. 10, 1906.
3 SHEETS—SHEET 2.
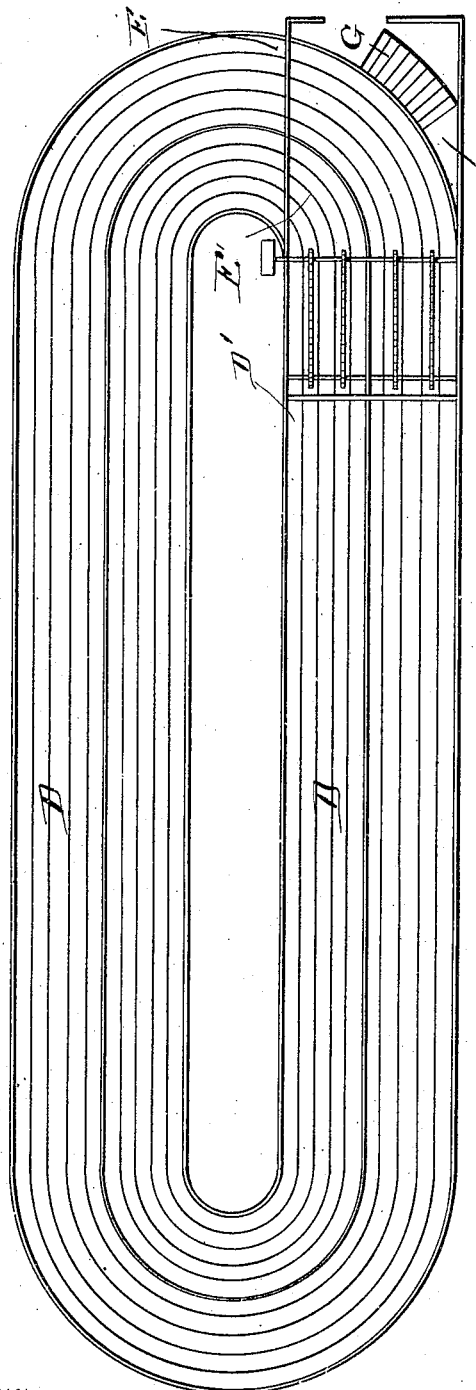
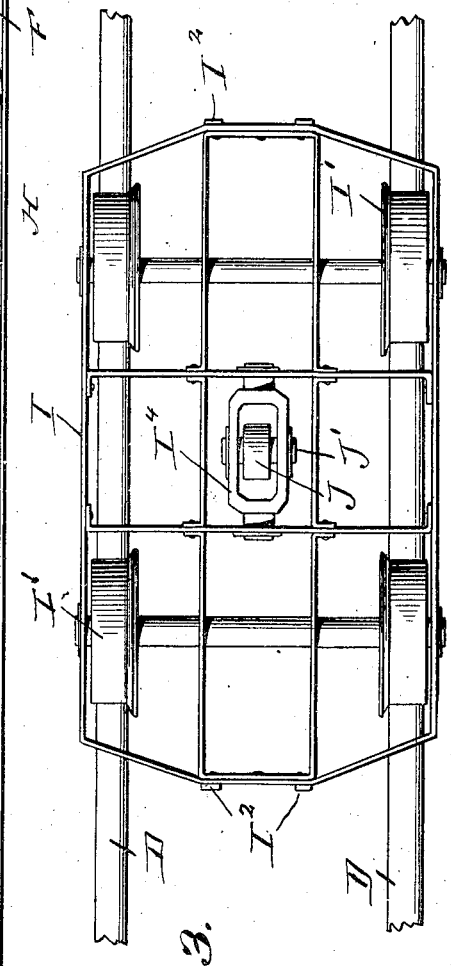
Witnesses
W. A. Williams.
Rea P. Albright.
Inventor
A. Francovich
By O'Meara & Brock
Attorneys No. 844,116. PATENTED FEB. 12, 1907.
A. FRANCOVICH.
AMUSEMENT DEVICE.
APPLICATION FILED FEB. 10, 1906.
3 SHEETS—SHEET 3.
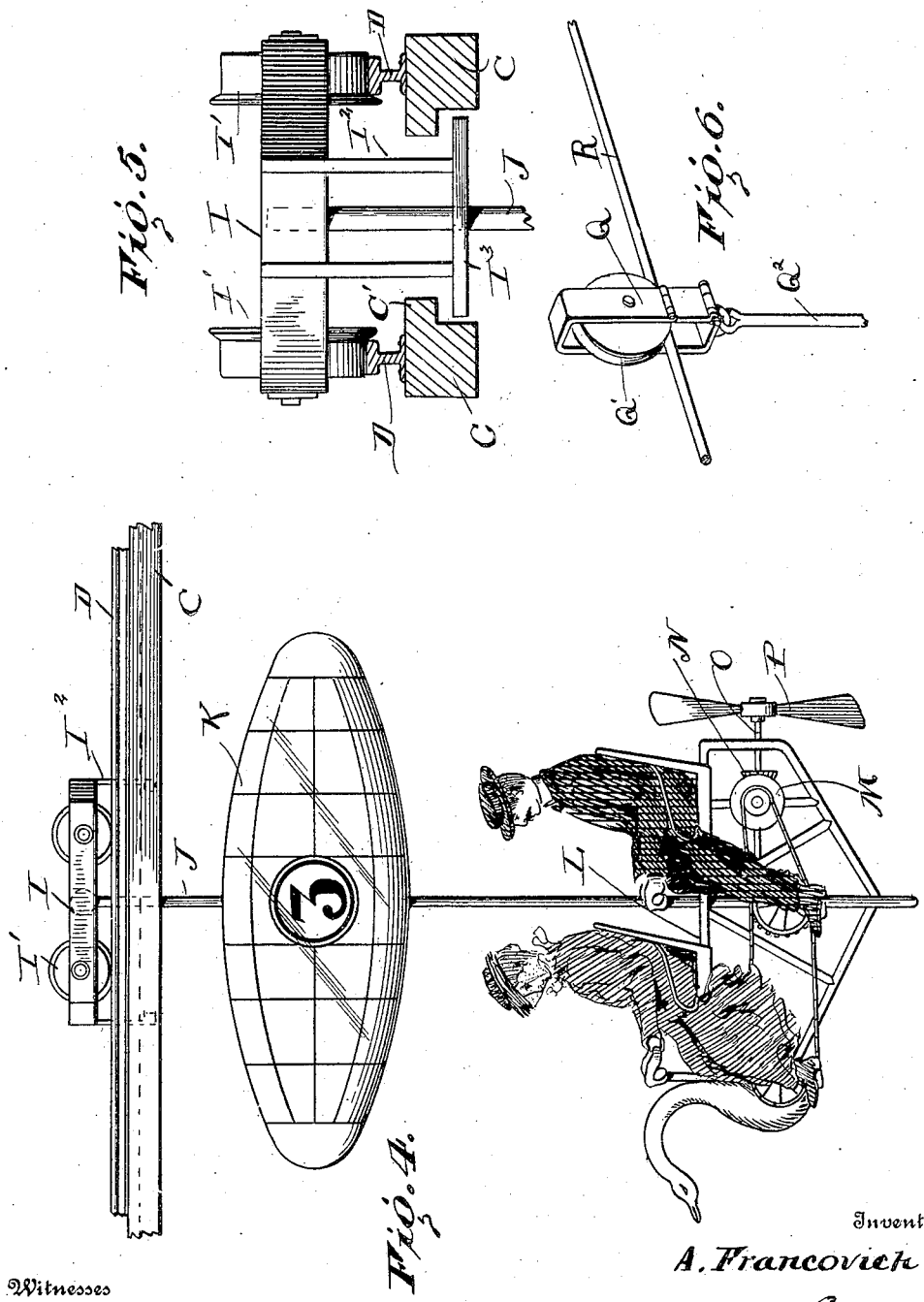
Witnesses
W. A. Williams.
Asa P. Albright.
Inventor
A. Francovich
By O'Meara & Brock
Attorneys

UNITED STATES PATENT OFFICE.

AUGUSTE FRANCOVICH, OF PARIS, FRANCE.

AMUSEMENT DEVICE.

No. 844,116.  Specification of Letters Patent.  Patented Feb. 12, 1907.

Application filed February 10, 1906. Serial No. 300,471.

*To all whom it may concern:*

Be it known that I, AUGUSTE FRANCOVICH, a citizen of the Republic of France, Province of the Seine, residing at Paris, have invented a new and useful Improvement in an Amusement Device, of which the following is a specification.

My invention relates to amusement devices, and more particularly to gravity-railways in which a bicycle is suspended and descends upon inclined rails to a stopping-point, where it is lifted up to the starting-point by an endless chain, the object being to provide the bicycle with propelling means, so the speed can be increased by the rider when desired.

Another object is to provide a traveling carriage which will have the appearance of a flying-machine.

With these objects in view the invention consists in providing oval-shaped elevated tracks arranged in pairs, on which trucks are adapted to run supporting the bicycles; and the invention also consists in providing the bicycles with the ordinary crank and pedals, which are geared up to a shaft extending out to the rear provided with propellers for the purpose of driving the bicycle forward.

The invention consists also in arranging a dummy balloon above the bicycle or carriage.

With these objects in view the invention consists also in the novel features of construction, combination, and arrangement of parts hereinafter fully described, and pointed out in the claims.

In the drawings forming a part of this specification, Figure 1 is a transverse sectional view of the track, showing one of the supporting-frames and the car and bicycle in place. Fig. 2 is a plan view of the tracks. Fig. 3 is a top plan view of the truck mounted on the track, showing the ends of the track broken away. Fig. 4 is a side view of the truck, showing a tandem attached. Fig. 5 is a transverse section through the track, showing the truck arranged thereon. Fig. 6 is a perspective of the modification.

Referring to the drawings, A indicates one of the supporting-frames, which are provided with hangers B, on which the runners C, carrying the tracks D, are mounted. In the drawings I have shown four pairs of tracks running parallel to each other; but it is of course understood that any desired number can be used and that the number of frames used will be according to the size of the cars used and the weight they will carry. The frames are of unequal height, so that inclined tracks are formed, which are preferably oval in shape, but may be any shape desired. The highest frame is arranged at the point D' and the shortest at a point E, it being understood that the frames can be arranged so as to form a rolling track, if desired. Frames of equal height are arranged at the point E', having a platform F arranged therein forming a starting-point having a set of steps G leading therefrom.

The tracks are inclined upwardly from the end of the platform F to the point D', having endless chains H arranged between the pairs adapted to engage the trucks and pull them up to the point D, where they will start downwardly by gravity. In Fig. 6 I have shown a cable and trolley which can be used with the same result for supporting the bicycles.

Arranged on the tracks are trucks I, provided with the ordinary wheels I' and provided with downwardly-projecting bars $I^2$, carrying a horizontal bar $I^3$ at their ends adapted to fit under the rabbeted edges C' of the runners C and prevent the trucks from accidentally leaving the track. These bars $I^3$ are also adapted to be engaged by lugs carried by the endless chains.

Secured in the center of each of the trucks I is a frame $I^4$, in which the cross-bar J' of the shaft J is pivoted. Cigar or balloon shaped bodies K, formed of any material desired, are secured to the shaft J under the truck and above the bicycle. To the lower end of each one of the shafts J are secured tandems L, it of course being understood that bicycles can be secured with the same results. The tandems are provided with the usual sprocket-wheels and cranks carrying a chain which passes over a sprocket arranged on the bevel gear-wheel M, which meshes with a bevel gear-wheel N, carried by the shaft O, which is provided with propellers P at the rear end, adapted to drive the tandems and truck forwardly along the track.

In the modification shown in Fig. 6 I have shown a truck Q, provided with a wheel Q', adapted to travel over a cable R and provided with a bar $Q^2$, adapted to support a bicycle.

From the foregoing description it will be seen that I have provided a very novel amusement device in the form of a race-track in which parallel tracks are provided with trucks supporting bicycles carrying propeller means so arranged to represent an air-ship at a considerable height above the earth-surface. These cars are adapted to be started at the highest part of the track at the same time, the object being to reach the other end of the track first, which will depend on the riders of the tandem or bicycle.

Having thus fully described my invention, what I claim as new, and desire to secure by Letters Patent, is—

1. In a device of the kind described, the combination with elevated inclined tracks, of a truck carrying a bicycle mounted on said track, a propeller carried by said bicycle and means for connecting said propeller to the pedals of the bicycle for the purpose described.

2. In an amusement device the combination with a series of pairs of elevated inclined tracks, of trucks arranged on said tracks supporting bicycles, propellers mounted on said bicycles and means for connecting the pedals of the bicycle to the propellers for the purpose described.

3. In an amusement device, the combination with a series of pairs of elevated inclined tracks, of trucks arranged on said tracks, shafts pivotally mounted on said trucks, bicycles carried by said shafts, and propeller carried by said bicycles connected to the pedals, for the purpose described.

4. In an amusement device, the combination with a series of pairs of elevated inclined tracks formed oval-shaped, of trucks arranged on said tracks supporting bicycles provided with propellers adapted to be driven by the pedals of the bicycles, retaining means carried by said cars, and means for raising said cars from the stopping-point to the starting-point, for the purpose described.

5. In an amusement device, the combination with a series of pairs of elevated oval-shaped tracks, carried by frames of unequal height, of trucks arranged on said tracks, shafts pivoted on said trucks, bicycles carried by the end of said shafts provided with propellers adapted to be driven by the pedals of the bicycles, and means arranged between said tracks for raising said cars from the stopping-point to the starting-point, for the purpose described.

6. In a device of the kind described, the combination with a series of pairs of oval-shaped tracks, arranged on frames of unequal height, of trucks mounted on said tracks provided with supporting-shafts, bicycles mounted on said shafts, provided with propellers and operating means connecting the said propellers to the pedals of the bicycles for the purpose described.

7. In a device of the kind described, the combination with a pair of elevated oval-shaped inclined tracks, of trucks mounted on said tracks provided with locking means, a cross-bar pivoted in said trucks carrying a shaft, a bicycle secured to said shaft, provided with crank and sprocket wheels, a shaft carried by said bicycle provided with a propeller at one end and a bevel-gear at the other, a sprocket provided with a bevel-gear meshing with the bevel-gear of the shaft and a chain passing over the sprocket-chain and the sprocket carrying the bevel-gear, for the purpose described.

8. In a device of the kind described, the combination with a series of pairs of oval-shaped elevated inclined tracks, of trucks mounted on said tracks provided with downwardly-projecting bars at each end connected by horizontal bars adapted to lock the trucks on said tracks, shafts loosely suspended on said trucks, bicycles provided with propelling means secured on said shafts, endless chains arranged between said tracks between the highest and lowest points of said tracks, and means carried by said chains adapted to engage the horizontal bars of the trucks, for the purpose described.

AUGUSTE FRANCOVICH.

Witnesses:
FERDINAND POITE,
LOUIS LAURIN.